United States Patent
Cox et al.

(10) Patent No.: US 11,586,693 B2
(45) Date of Patent: Feb. 21, 2023

(54) DISPLAYING MULTI-SOURCE CONTENT BASED ON INTERACTION DATA

(71) Applicant: Dell Products L.P., Round Rock, TX (US)

(72) Inventors: Tyler Ryan Cox, Austin, TX (US); Erik Summa, Austin, TX (US); Marc Randall Hammons, Round Rock, TX (US); Richard William Schuckle, Austin, TX (US); Jake Mitchell Leland, Round Rock, TX (US); Ryan Nicholas Comer, Pflugerville, TX (US)

(73) Assignee: Dell Products L.P., Round Rock, TX (US)

(*) Notice: Subject to any disclaimer, the term of this patent is extended or adjusted under 35 U.S.C. 154(b) by 226 days.

(21) Appl. No.: 17/149,049

(22) Filed: Jan. 14, 2021

(65) Prior Publication Data
US 2022/0222307 A1 Jul. 14, 2022

(51) Int. Cl.
| | |
|---|---|
| *G06F 16/9536* | (2019.01) |
| *G06F 9/451* | (2018.01) |
| *A63F 13/798* | (2014.01) |
| *G06F 16/2457* | (2019.01) |
| *G06F 16/9535* | (2019.01) |
| *G06F 16/9538* | (2019.01) |

(52) U.S. Cl.
CPC ........ *G06F 16/9536* (2019.01); *A63F 13/798* (2014.09); *G06F 9/451* (2018.02); *G06F 16/24578* (2019.01); *G06F 16/9535* (2019.01); *G06F 16/9538* (2019.01)

(58) Field of Classification Search
CPC ...... A63F 13/46; A63F 13/798; A63F 13/795; A63F 13/35; A63F 13/86; G06F 16/9538; G06F 16/9536; G06F 16/24578; G06F 16/9535
See application file for complete search history.

(56) References Cited

U.S. PATENT DOCUMENTS

2020/0184490 A1* 6/2020 Christiansen ....... G06F 16/9535

* cited by examiner

*Primary Examiner* — Etienne P Leroux
(74) *Attorney, Agent, or Firm* — McDermott Will & Emery LLP (57) ABSTRACT

Displaying multi-source content based on interaction data, including: identifying user interaction data associated with computer-implemented applications, the user interaction data including interaction data of a particular user; identifying social interaction data associated with the computer-implemented applications, the social interaction data including interaction data of one or more social contacts of the particular user; identifying regional interaction data associated with the computer-implemented applications, the regional interaction data including interaction data of users of a particular region; aggregating content associated with the computer-implemented applications based on the user interaction data, the filtered social interaction data, and the filtered regional interaction data; scoring the aggregated content based on weight components; applying, based on the content scores, interface adjustments to interface elements of a graphical timeline, the graphical timeline depicting the interface elements associated with the computer-implemented applications; and rendering the graphical timeline for display on a display device.

20 Claims, 7 Drawing Sheets

DISPLAYING MULTI-SOURCE CONTENT BASED ON INTERACTION DATA

BACKGROUND

Field of the Disclosure

The disclosure relates generally to an information handling system, and in particular, displaying multi-source content based on interaction data.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method of method of displaying multi-source content based on interaction data, the method comprising: identifying user interaction data associated with one or more computer-implemented applications, the user interaction data including interaction data of a particular user; identifying social interaction data associated with the one or more computer-implemented applications, the social interaction data including interaction data of one or more social contacts of the particular user; identifying regional interaction data associated with the one or more computer-implemented applications, the regional interaction data including interaction data of users of a particular region; filtering the user interaction data based on an effort weight component and a rarity weight component; filtering the social interaction data based on a friend rank weight component, a content similarity weight component, the effort weight component, an engagement weight component, and the rarity weight component; filtering the regional interaction data based on the engagement weight component and a game rank component; aggregating content associated with the computer-implemented applications based on the filtered user interaction data, the filtered social interaction data, and the filtered regional interaction data; scoring the aggregated content based on one or more weight components; applying, based on the content scores, interface adjustments to one or more interface elements of a graphical timeline, the graphical timeline depicting the one or more interface elements associated with the one or more computer-implemented applications; and rendering the graphical timeline for display on a display device.

Other embodiments of these aspects include corresponding systems, apparatus, and computer programs, configured to perform the actions of the methods, encoded on computer storage devices.

These and other embodiments may each optionally include one or more of the following features. For instance, identifying user engagement with the graphical timeline by the particular user; updating the one or more weight components based on the user engagement; and updating the scoring of the aggregated content based on the one or more updated weight components associated with the particular user. The one or more weight components include the effort weight component, the rarity weight component, the friend rank weight component, the game rank weight component, the content similarity weight component, and the engagement weight component. Scoring the aggregated content based on the one or more weight components includes scoring the aggregated content based on the engagement weight component, effort weight component, and the rarity weight component. The effort weight component is based on quantified interactions by the particular user with the one or more computer-implemented applications relative to quantified interactions by a population of other users. The rarity weight component is based on a distribution of a population of other users with a similar performance level of the computer-implemented application as the particular user. The friend rank component is based on an affinity to other users socially connected to the particular user. The game rank component is based on a likelihood of the particular user to engage with the one or more computer-implemented applications. The content similarity weight component is based on a similarity of content items of the one or more computer-implemented applications. The engagement weight component is based on a number of social interactions by the particular user and associated with the one or more computer-implemented application.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This disclosure discusses methods and systems for displaying multi-source content based on interaction data. In short, a display can provide for display a graphical timeline that can include recommended content items related to computer-implemented applications. When the computer-implemented applications include gaming applications, the graphical timeline can provide recommended content (key interaction content) related to a user of the information handling system 100 and interactions of the user with the gaming application (e.g., game sessions played by the user or friends; associated textual events, or immersive curated content from themselves, friends, social networks, or broader ecosystem sources; and achieved awards, challenges, and objectives from friends, social networks, or broader ecosystem events). For example, the content items included by the graphical timeline can include game card content items of the gaming applications, game sessions card content items, achievement card content items, event or stream card content items, reward progression card content items, and/or future event content items. A content aggregation computing module can aggregate the content items for possible display on the graphical timeline based on user interaction data, social interaction data, and regional interaction data. A content scoring computing module can assign scores to the content items based on weighted values (e.g., a rarity weight component, a friend rank weight component, a game rank weight component, a content similarity weight component, and an engagement weight component). An interface creator computing module can update visual elements of the content items based on the scoring of the content items, and renders the graphical timeline based on such updated visual elements.

Specifically, this disclosure discusses a system and a method for displaying multi-source content based on interaction data, the method including identifying user interaction data associated with one or more computer-implemented applications, the user interaction data including interaction data of a particular user; identifying social interaction data associated with the one or more computer-implemented applications, the social interaction data including interaction data of one or more social contacts of the particular user; identifying regional interaction data associated with the one or more computer-implemented application, the regional interaction data including interaction data of users of a particular region; aggregating content associated with the computer-implemented applications based on the user interaction data, the social interaction data, and the regional interaction data; scoring the aggregated content based on one or more weight components; applying, based on the content scores, interface adjustments to one or more interface elements of a graphical timeline, the graphical timeline depicting the interface elements associated with the one or more computer-implemented application; and rendering the graphical timeline for display on a display device.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-6 wherein like numbers are used to indicate like and corresponding parts.

Figure 1:
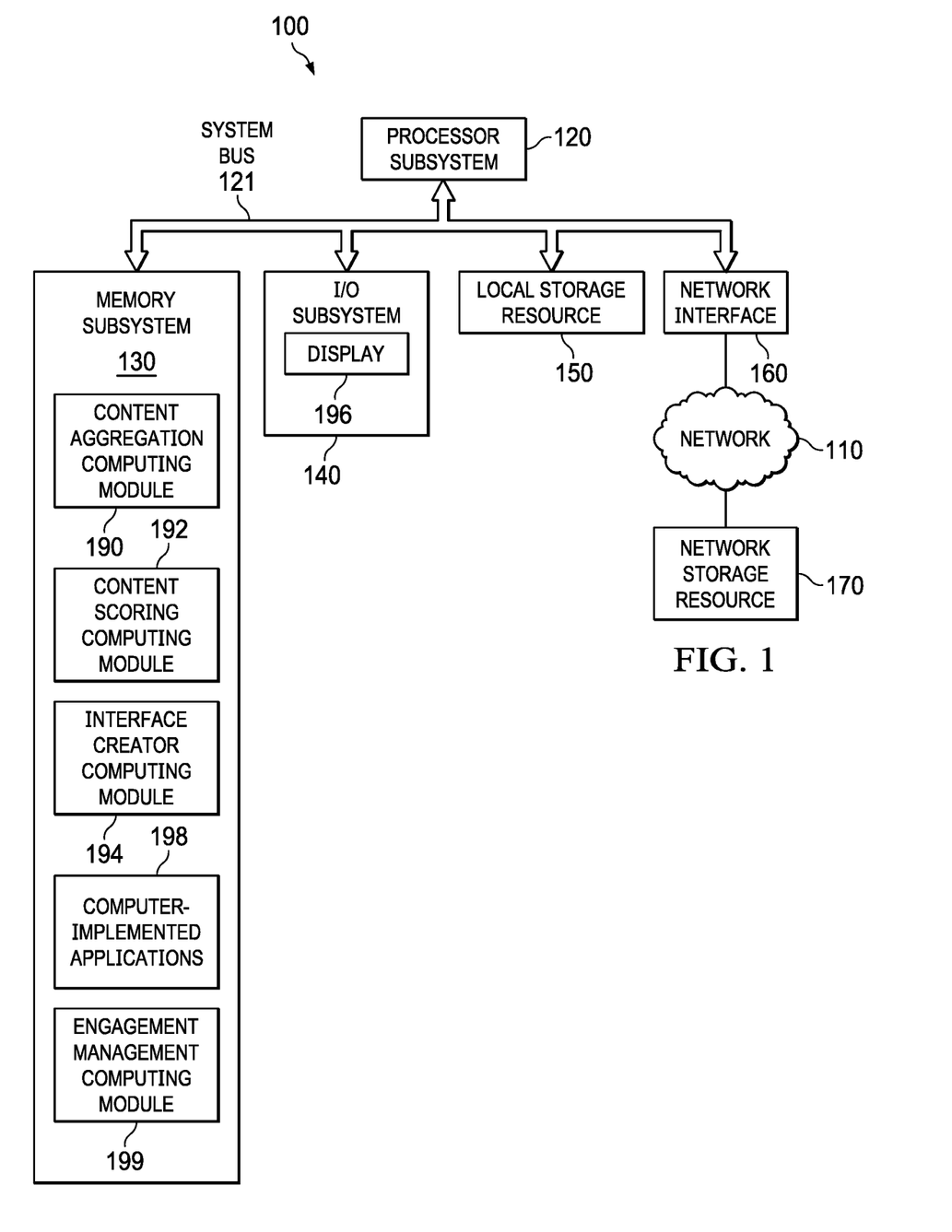
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as display devices, head mounted displays, head mounted display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as information handling system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device. For example, the information handling system 100 can include a display 196 (or a display device 196).

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource 170 may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a content aggregation computing module 190. The content aggregation computing module 190 can be included by the memory subsystem 130. The content aggregation computing module 190 can include a computer-executable program (software). The content aggregation computing module 190 can be executed by the processor subsystem 120.

The information handling system 100 can also include a content scoring computing module 192. The content scoring computing module 192 can be included by the memory subsystem 130. The content scoring computing module 192 can include a computer-executable program (software). The content scoring computing module 192 can be executed by the processor subsystem 120.

The information handling system 100 can also include an interface creator computing module 194. The interface creator computing module 194 can be included by the memory subsystem 130. The interface creator computing module 194 can include a computer-executable program (software). The interface creator computing module 194 can be executed by the processor subsystem 120.

The information handling system 100 can also include computer-implemented applications 198. The computer-implemented applications 198 can be included by the memory subsystem 130. The computer-implemented applications 198 can include a computer-executable program (software). The computer-implemented applications 198 can be executed by the processor subsystem 120.

The information handling system 100 can also include an engagement management computing module 199. The engagement management computing module 199 can be included by the memory subsystem 130. The engagement management computing module 199 can include a computer-executable program (software). The engagement management computing module 199 can be executed by the processor subsystem 120.

In short, the display 196 can provide for display a graphical timeline that can include recommended content items related to the computer-implemented applications 198. When the computer-implemented applications 198 include gaming applications, the graphical timeline can provide recommended content (key interaction content) related to a user of the information handling system 100 and interactions of the user with the gaming application (e.g., game sessions played by the user or friends; associated textual events, or immersive curated content from themselves, friends, social networks, or broader ecosystem sources; and achieved awards, challenges, and objectives from friends, social networks, or broader ecosystem events). For example, the content items included by the graphical timeline can include game card content items of the gaming applications, game sessions card content items, achievement card content items, event or stream card content items, reward progression card content items, and/or future event content items. The content aggregation computing module 190 can aggregate the content items for possible display on the graphical timeline based on user interaction data, social interaction data, and regional interaction data. The content scoring computing module 192 can assign scores to the content items based on weighted values (e.g., a rarity weight component, a friend rank weight component, a game rank weight component, a content similarity weight component, and an engagement weight component). The interface creator computing module 194 can update visual elements of the content items based on the scoring of the content items, and renders the graphical timeline based on such updated visual elements.

Figure 2:
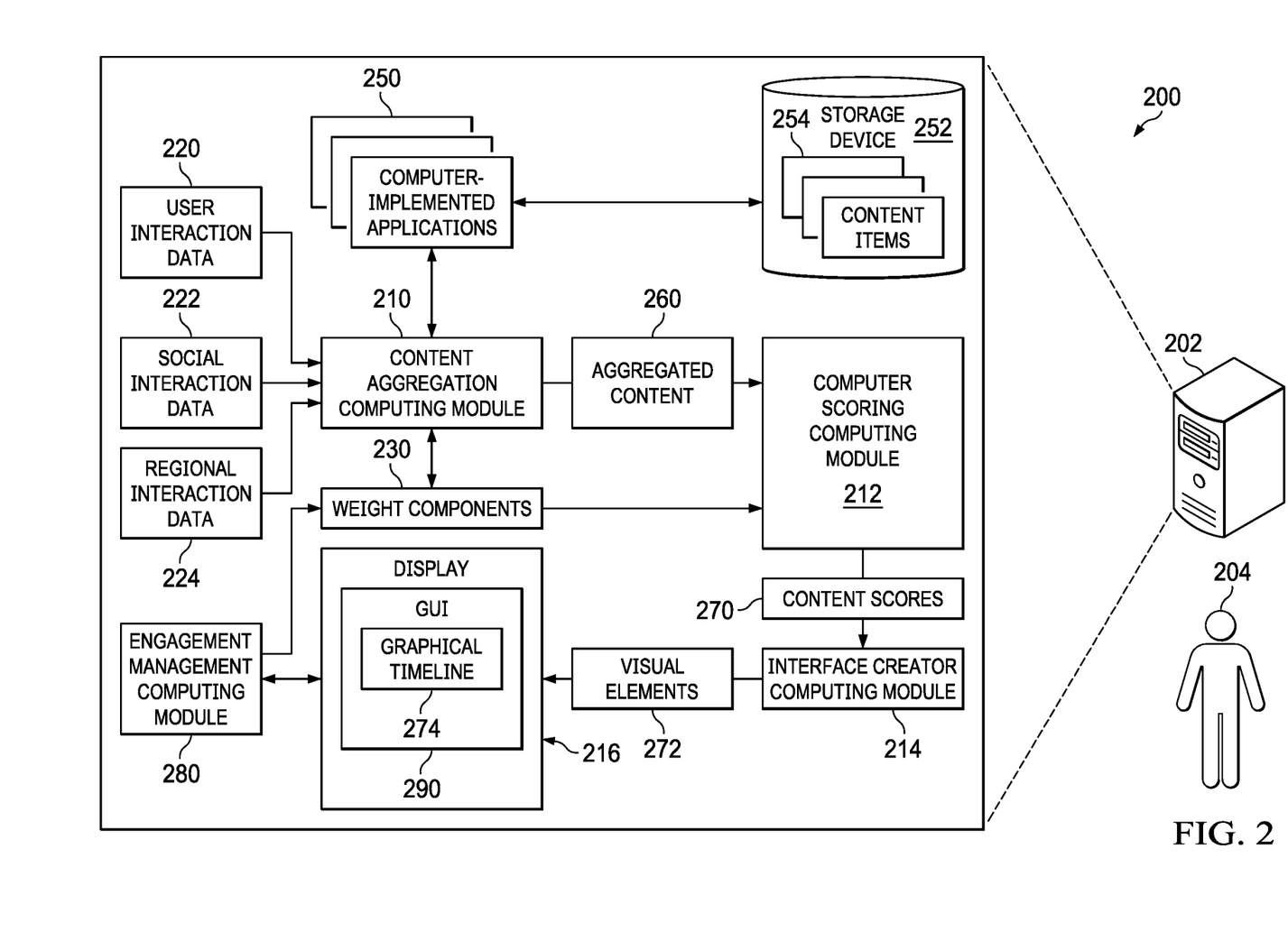
FIG. 2 illustrates a block diagram of an information handling system for displaying multi-source content based on interaction data.

Turning to FIG. 2, FIG. 2 illustrates an environment 200 including an information handling system 202 and a user 204. The information handling system 202 can include a content aggregation computing module 210, a content scoring computing module 212, an interface creator computing module 214, a display 216, computer-implemented applications 250, a storage device 252, and an engagement management computing module 280. In some examples, the information handling system 202 is similar to, or includes, the information handling system 100 of FIG. 1. In some examples, the content aggregation computing module 210 is the same, or substantially the same, as the content aggregation computing module 190 of FIG. 1. In some examples, the content scoring computing module 212 is the same, or substantially the same, as the content scoring computing module 192 of FIG. 1. In some examples, the interface creator computing module 214 is the same, or substantially the same, as the interface creator computing module 194 of FIG. 1. In some examples, the display 216 is the same, or substantially the same, as the display 196 of FIG. 1. In some examples, the computer-implemented applications 250 are the same, or substantially the same, as the computer-implemented applications 198 of FIG. 1.

The storage device 252 can further store, or provide access to, content items 254. The content items 254 can be displayed by a graphical user interface (GUI) 260 provided by the display 216.

Figure 3:
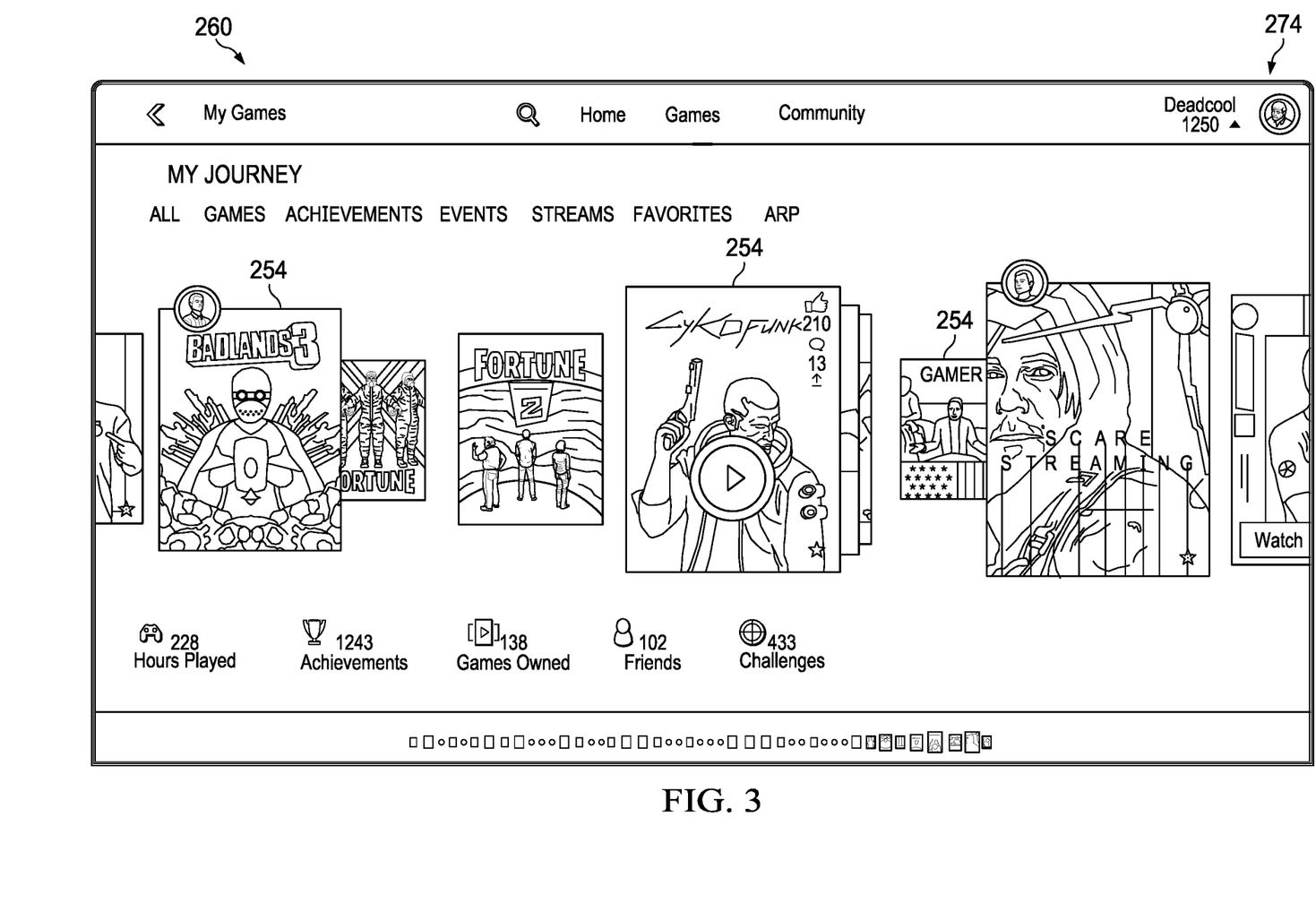
FIG. 3 illustrates a graphical timeline displaying content items.
Figure 4A:
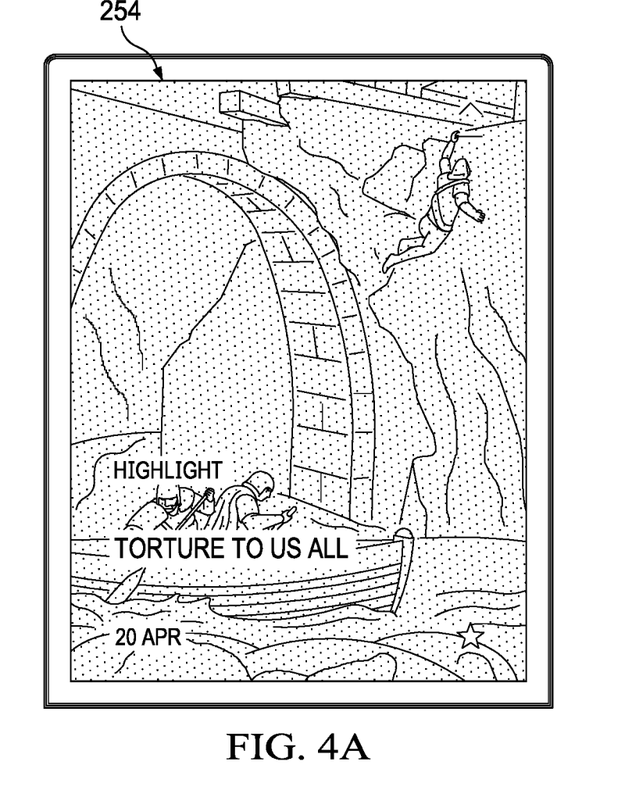
FIGS. 4A, 4B, 4C, 4D, 4E illustrate example content items that are displayed.
Figure 4B:
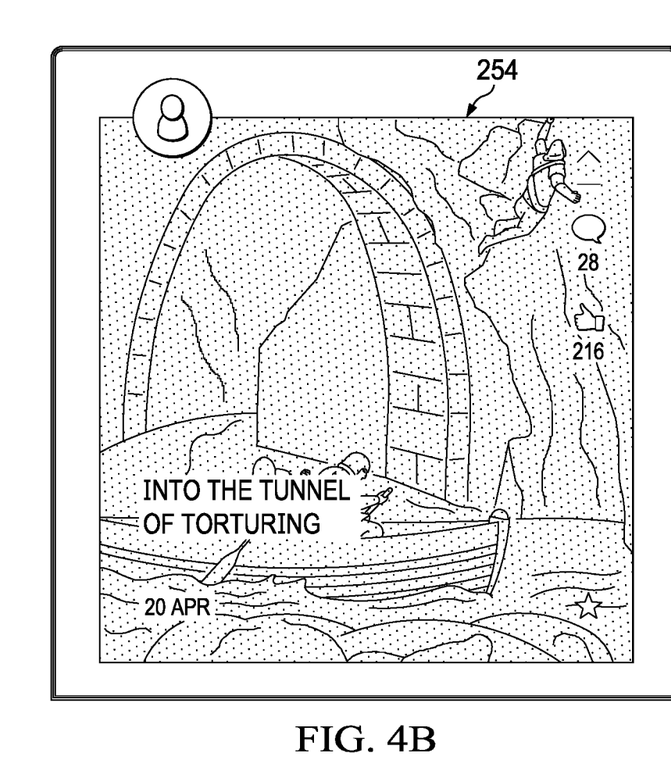
Figure 4C:
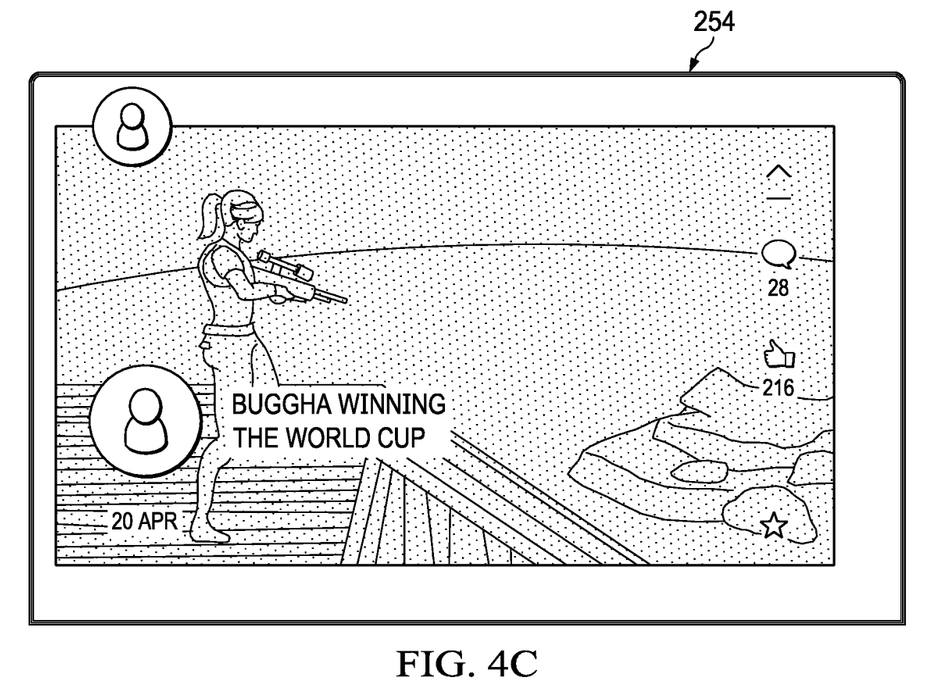
Figure 4D:
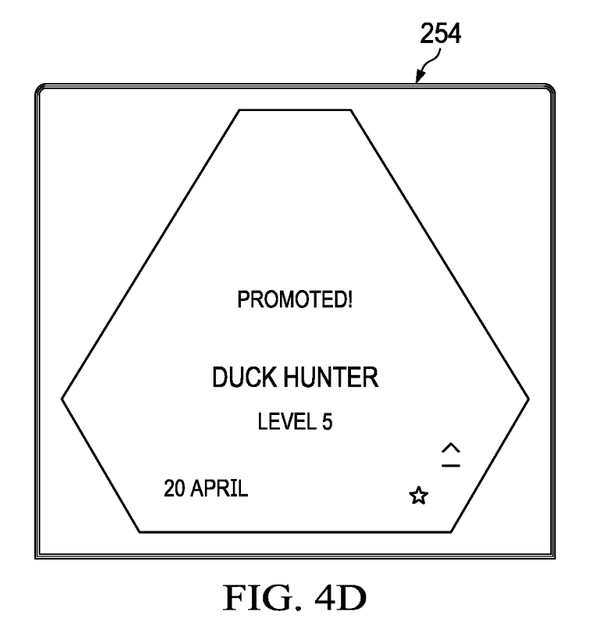
Figure 4E:
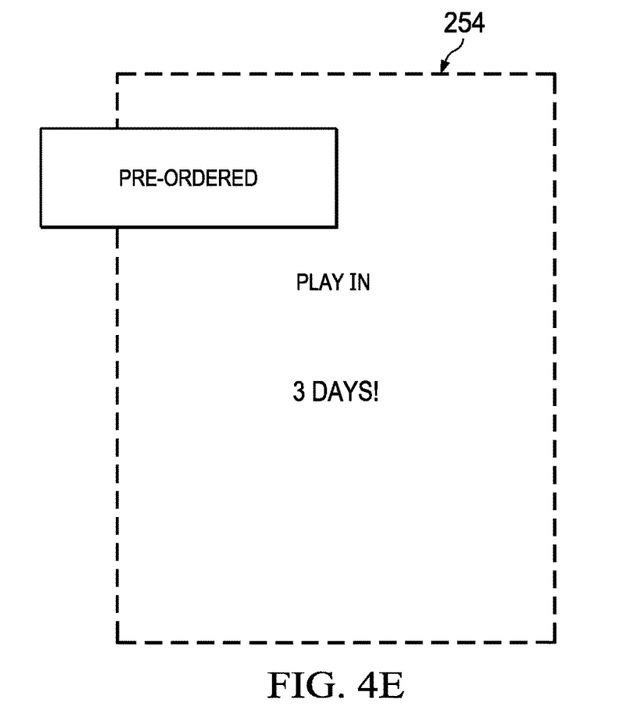

The content items 254 can be associated with the computer-implemented applications 250. The content items 254 can include any visual item that is displayed that is associated with the computer-implemented applications 250. For example, when the computer-implemented applications 250 include gaming applications, the content items 254 can include key interaction content associated with the gaming applications such as associated textual, event, or immersive content, including achieved awards, challenges, and objectives. Referring to FIG. 3, the GUI 260 is shown including a graphical timeline 274 displaying the content items 254. As shown, the content items 254 include game cards of the computer-implemented applications 250. In some examples, the content items 254 can include game sessions cards (as shown in FIG. 4A), achievement cards (as shown in FIG. 4B), event or stream cards (as shown in FIG. 4C), reward progression cards (as shown in FIG. 4D), or future event cards (as shown in FIG. 4E). However, the content items 254 can include any type of content that is displayable by the GUI 260. The graphical timeline 274 can include any combination of types of the content items 254.

The content aggregation computing module 210 can be in communication with the computer-implemented applications 250 and the content scoring computing module 212. The content scoring computing module 212 can be in communication with the interface creator computing module 214. The interface creator computing module 214 can be in communication with the display 216.

The content aggregation computing module 210 can identify user interaction data 220 of the user 204 associated with one or more of the computer-implemented applications 250. The user interaction data 220 can include interaction data of the user 204 with the computer-implemented applications 250 over one or more sessions, including content consumption and ecosystem activities associated with the computer-implemented applications 250. For example, the computer-implemented applications 250 can include gaming applications. The user interaction data 220 can include game data and game play session information of the computer-implemented applications 250 by the user 204. For example, the user interaction data 220 can include an amount of time interacting with each of the computer-implemented applications 250, including a number of sessions wherein the user 204 interacts with each of the computer-implemented applications 250. For example, the user interaction data 220 can include a number of times the user 204 interacted with each of the computer-implemented applications 250 with other users, such as social contacts ("online friends"), and a number of social contacts the user 204 engaged with while interacting with each of the computer-implemented applications 250. For example, the user interaction data 220 can include data of the specific computer-implemented applications 250 the user 204 interacts with, including title (name), class, franchise, genre, role, character, mode, and/or objective-based data. For example, the user interaction data 220 can include a number of social interactions, sentiment of the interactions, network interactions, and recency of interactions by the user 204 associated with the computer-implemented applications 250. The user interaction data 220 can include achievements and/or statistics associated with each of the computer-implemented applications by the user 204.

The content aggregation computing module 210 can identify social interaction data 222 of other users associated with the one or more computer-implemented applications 250. Specifically, the other users can interact with local versions of the computer-implemented applications 250 provided by respective information handling systems that are connected to the information handling system 202 via one or more networks (e.g., the cloud or Internet). That is, the social interaction data 222 can include interaction data of one more social contacts ("online friends") of the user 204. That is, the social contacts can be users that "connect" to the user 204 (e.g., via a social graph). The social interaction data 222 can include interaction data of the other users with the computer-implemented applications 250 over one or more sessions, including content consumption and ecosystem activities associated with the computer-implemented applications 250. The user interaction data 220 can include game data and game play session information. For example, the social interaction data 222 can include an amount of time interacting with each of the computer-implemented applications 250 by the social contact users, including a number of sessions that the social contact users interact with each of the computer-implemented applications 250. For example, the social interaction data 222 can include a number of social interactions, sentiment of the interactions, network interactions, and recency of interactions by the social contact users of the user 204. The user interaction data 220 can include achievements and/or statistics associated with each of the computer-implemented applications 250 by the social contacts of the user 204.

The content aggregation computing module 210 can identify regional interaction data 224 of other users associated with one or more computer-implemented applications. Specifically, the other users can interact with local versions of the computer-implemented applications 250 provided by respective information handling systems that are connected to the information handling system 202 via one or more networks (e.g., the cloud or Internet). The regional interaction data 224 can include interaction data of users within a specific region—e.g., a region including the user 204 (city, county, state, country)—with the computer-implemented applications 250 over one or more sessions, including content consumption and ecosystem activities associated with the computer-implemented applications 250. The user interaction data 220 can include game data and game play session information. For example, the regional interaction data 224 can include an amount of time interacting with each of the computer-implemented applications 250 by the regional users, including a number of sessions wherein the regional users interact with each of the computer-implemented applications 250. For example, the regional interaction data 224 can include a number of social interactions, sentiment of the interactions, network interactions, and recency of interactions by the regional users. The regional interaction data 224 can include achievements and/or statistics associated with each of the computer-implemented applications 250 by the regional users.

The content aggregation computing module 210 can filter the user interaction data 220, the social interaction data 222, and the regional interaction data 224 based on weight components 230. The weight components 230 can include an effort weight component, a rarity weight component, a friend rank weight component, a game rank weight component, a content similarity weight component, and an engagement weight component.

In some examples, the effort weight component is based on quantified interactions by the user 204 with the one or more computer-implemented applications 250 relative to quantified interactions by a population of other users. Specifically, the content aggregation computing module 210 can calculate the effort weight component as a function of an amount of time, sessions, and/or sessions needed to earn/complete/achieve particular content or level or success compared to global effort distributions for the one or more computer-implemented applications 250. That is, the effort weight component is a function of time spent by the user 204 with a particular computer-implemented application 250 as compared to a population of other users (e.g., the social contact users of the user 204, or a regional population of users). In some examples, the effort weight component is a function of time spent by the user 204 for obtaining an achievement or award or content item for a particular computer-implemented application 250 as compared to the average time spent by the population of other users (e.g., the social contact users of the user 204, or a regional population of users).

In some examples, the rarity weight component is based on a distribution of a population of other users with a similar performance level of a computer-implemented application 250 as the user 204. Specifically, the content aggregation computing module 210 can calculate the rarity weight component as a function of a distribution of other users (e.g., the social contact users of the user 204, or a regional population of users) with the same, or similar, achievement/level of performance and the distribution of effort needed to earn such achievement/level of performance for the computer-implemented application 250. In other words, the rarity weight component is based on how "common" it is for an achievement/level of performance to be obtained by a user (e.g. the user 204 as compared to a distribution of other users). For example, a first achievement/level of performance of a computer-implemented application 250 that is associated with 400 hours of interaction compared to a second achievement/level of performance of a computer-implemented application 250 that is associated with 30 minutes can have a higher quantified rarity for the rarity weight component.

In some examples, the friend rank component is based on an affinity to other users socially connected to the user 204. Specifically, the content aggregation computing module 210 can calculate the friend rank as a function of an affinity or strength of friendship to other users socially connected to the user 204. That is, the content aggregation computing module 210 can determine the friend rank of each of the users socially connected to the user 204 (or a population of users, such as regional users) that indicates how "close" the other user is to the user 204—e.g., the affinity for another user the user 204 frequently interacts with (engages with the same computer-implemented applications 250) is higher than an affinity for another user the user 204 seldomly interacts with (engaged with the same computer-implemented applications 250). In some cases, the friend rank component can be based on the popularity of the other user—e.g., whether the other is a popular "streamer" of the computer-implemented application 250.

In some examples, the game rank component is based on a likelihood of the user 204 to engage with the computer-implemented applications 250. Specifically, the content aggregation computing module 210 can calculate the game rank as a function of interactions by the user 204, such as in-game and out-of-game events, user statistics and gameplay data (e.g., records, achievements, performance, roles), time-based factors (time of day, expected session duration), historical activities, social indications (e.g., chat and/or voice input content, tone-based sentiment, biometrics, and secondary content selection (e.g., music playlist)), non-gameplay content interactions (e.g., reading articles, viewing relevant streams), and user feedback (e.g., active (limited or rich voting), user focus (gaze, hover, mouse), and passive (non-voting interaction/consumption/selection of recommended/non-recommended content)).

In some examples, the content similarity weight component is based on a similarity of content items 254 of the computer-implemented applications 250. Specifically, the content aggregation computing module 210 can calculate the content similarity weight component, when the computer-implemented application 250 includes a gaming application, as a function of class, game, franchise, genre, role, character, mode, objective of an achievement/match/session/level of performance between content items 254 of the computer-implemented applications 250. That is, the content similarity weight component is a quantified similarity between different events or sessions (of interaction with the computer-implemented application 250) in a vector space based on, for example, the class of the game, the franchise of the game, roles of the game, character similarities of the game, mood similarities, and objective similarities of the content items (or event items) of the computer-implemented application 250.

In some examples, the engagement weight component is based on a number of social interactions by the user 204 and associated with the computer-implemented applications 250. Specifically, the content aggregation computing module 210 can calculate the engagement weight component as a function of the number of interactions with a content item 254 such as social interactions—e.g., favorites, shares, clicks, hover, gaze, attention, launches, views, likes, comments, votes, awards, emotive reactions, upvoting, and/or viewing of the content items 254. The content aggregation computing module 210 can calculate the engagement weight component as a function of sentiment of the interactions, adjusted network interactions (e.g., top socially connected users, local social network, gaming persona, region, country, language, global), recency of interactions, and virality. In other words, the engagement weight component quantifies how the user 204, the social contacts of the user 204, and regional (or global) populations interact with the content items 254. In some cases, the type of engagement can be quantified at different levels—e.g., clicking on a content item 254 can have a higher weight as compared to a content item 254 the user 204 gazes at. Another type of quantified level can include a content item 254 that the user 204 engages with having a higher weight as compared to a content item 254 that a global population engages with.

The content aggregation computing module 210 can filter the user interaction data 220 based on the effort weight component and the rarity weight component. In some cases, the content aggregation computing module 210 can further filter the user interaction data 220 by a recency of the data. The content aggregation computing module 210 can filter the social interaction data 222 based on the friend rank weight component, the content similarity weight component, the effort weight component, the engagement weight component, and the rarity weight component. The content aggregation computing module 210 can filter the regional interaction data 224 based on the engagement weight component and the game rank weight component.

The content aggregation computing module 210 can aggregate content items 254 associated with the computer-implemented applications 250 based on the user interaction data 220, the social interaction data 222, and the regional interaction data 224. Specifically, the content aggregation computing module 210 can aggregate the content items 254 based on the filtered user interaction data 220, the filtered social interaction data 222, and the filtered regional interaction data 224. That is, the content aggregation computing module 210 can identify a subset of the content items 254 based on the filtered user interaction data 220, the filtered social interaction data 222, and the filtered regional interaction data 224, shown as aggregated content 290.

In some examples, the content aggregation computing module 210 can aggregate the content items 254 as the aggregated content 290 based on the content similarity weight component and the engagement weight component. The content aggregation computing module 210 can arrange and filter the content items 254 based on the content similarity weight component and the engagement weight component such that content items 254 that are more similar to previously interacted content items (and computer-implemented applications 250) and content items 254 that are previously engaged with more frequently (and computer-implemented applications 250) are filtered to a higher positioning as compared to other content items 254.

In some examples, the content aggregation computing module 210 can identify events associated with the content items 254 and/or the computer-implemented applications 250 for the aggregated content 290. The event data can include macro events, highlights, tournaments, releases, and/or updates that are related to the aggregated content 290 and the associated computer-implemented applications 250. For example, when the aggregated content 290 includes game cards of gaming applications (computer-implemented applications 250), the event data can include a tournament or championship (seasonal, weekly, daily) for a particular gaming application. Thus, such event information associated with aggregated content 290 can be filtered to a higher positioning as compared to other content items.

The content scoring computing module 212 can receive the aggregated content 290 and score the aggregated content 290 based on one or more of the weight components 230, shown as content scores 270. Specifically, the content scoring computing module 212 can score the aggregated content 290 based on the engagement weight component, the effort weight component, and the rarity weight component. For example, the content scoring computing module 212 can assign a higher score to the content items 254 of the aggregated content 290 that have a higher engagement weight component, effort weight competent, and rarity weight component for a first set computer-implemented applications 250 as compared to other content items 254 of the aggregated content 290 that have a lower engagement weight component, effort weight competent, and rarity weight component for a second set of computer-implemented applications 250. In some examples, the content scoring computing module 212 can rank, based on the score, the aggregated content 290, including ranking of sessions, events, and achievements of the aggregated content 290.

In some examples, the content scoring computing module 212 can additionally score the aggregated content 290 based on personal weights, and/or weighted social impact. For example, the personal weights can include a personal profile of the user 204, including interest parameters of the user such as immersive content interest weightings (e.g., of a gaming application), and competitive content interest weighting (e.g., of a gaming application).

The interface creator computing module 214 can receive the content scores 270 and apply, based on the content scores 270, interface adjustments to one or more interface elements 272 of the graphical timeline 274. That is, the graphical timeline 274 can depict the interface elements 272 associated with one or more of the computer-implemented applications 250. The graphical timeline 274 can be presented by the display 216 by the GUI 260.

In short, the graphical timeline 274 is a recommended driven user interface that streamlines the user experience by presenting key interaction content—e.g., the content scores 270. The interface creator computing module 214 can determine a presence, feature richness, layout characteristics, prominence, and conditional effect application of the graphical timeline 274 based on the content scores 270 (e.g., the scores of the content items 254).

For example, referring to FIGS. 2 and 3, the interface creator computing module 214 can adjust the interface elements 272 of the content items 254 (based on the content scores 270) presented on the graphical timeline 274, including adjusting layout size, z-depth, opacity, highlight, unique effects, and focus of the content items 254 based on the content scores 270. For example, adjusting the layout size of a content item 254 can include adjusting increase or decreasing the visual size of the content item 254 relative to other content items 254 based on the content scores 270. For example, adjusting the z-depth of a content item 254 can include increasing or decreasing the z-depth of the content item 254 in a two-dimensional render space of the graphical timeline 274 based on the content scores 270. For example, adjusting the opacity of a content item 254 can include increasing or decreasing an opacity of a content item relative to other content items 254 based on the content scores 270. For example, adding the highlight of a content item 254 can include increasing or decreasing a highlighting of the content item 254 relative to other content items 254 based on the content scores 270. For example, adjusting the unique effects of a content item 254 can including incorporating or removing unique effects of the content item 254 relative to other content items 254 based on the content scores 270. For example, adjusting the focus of the content item 254 can including include increasing or decreasing the focus of the content item 254 relative to other content items 254 based on the content scores 270.

The interface creator computing module 214 can render the graphical timeline 274 on the GUI 260, as shown in FIG. 3.

In some examples, the engagement management computing module 280 can identify an engagement with the graphical timeline 274 by the user 204. That is, the engagement management computing module 280 can identify a number of interactions, a length of the interactions, and/or a frequency of the interactions by the user 204 with the graphical timeline 274, and the content items 254. The engagement management computing module 280 can update values of the weight component 230 based on such user engagement. For example, the engagement management computing module 280 can update values of the weight components 230 such as the rarity weight component, the friend rank weight component, the game rank weight component, the content similarity weight component, and the engagement weight component based on the engagement by the user 204 with the graphical timeline 274.

The content scoring computing module 212 can then update the scoring of the aggregated content 290 based on the updated weight components 230. That is, the content scoring computing module 212 can score the aggregated content 290 based on one or more of the updated weight components 230, shown as content scores 270. Specifically, the content scoring computing module 212 can score the aggregated content 290 based on the updated engagement weight component, the updated effort weight component, and the updated rarity weight component.

Figure 5:
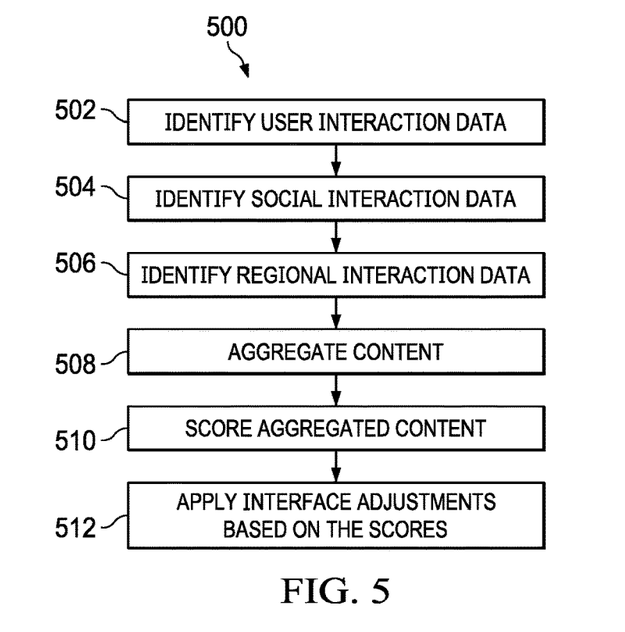
FIGS. 5 and 6 illustrate respective methods for displaying multi-source content based on interaction data.

FIG. 5 illustrates a flowchart depicting selected elements of an embodiment of a method 500 for displaying multi-source content based on interaction data. The method 500 may be performed by the information handling system 100, the information handling system 202, the content aggregation computing module 210, the content scoring computing module 212, the interface creator computing module 214, and/or the engagement management computing module 280, and with reference to FIGS. 1-4. It is noted that certain operations described in method 500 may be optional or may be rearranged in different embodiments.

The content aggregation computing module 210 identifies the user interaction data 220 associated with one or more computer-implemented applications 250 (502). The content aggregation computing module 210 identifies the social interaction data 222 associated with the one or more computer-implemented applications 250 (504). The content aggregation computing module 210 identifies regional interaction data 224 associated with the one or more computer-implemented applications 250 (506). The content aggregation computing module 210 aggregates content 254 associated with the computer-implemented applications 250 based on the user interaction data 220, the social interaction data 222, and the regional interaction data 224 (508). The content scoring computing module 212 scores the aggregated content 290 based on one or more weight components 230 (510). The interface creator computing module 214 applies, based on the content scores 270, interface adjustments to one or more interface elements 272 of a graphical timeline 274 (512). The interface creator computing module 214 renders the graphical timeline 274 for display on the display 216.

In some examples, the game rank component can include a user activity component. The user activity component can be based on sentiment of the user 204 that can include chat activity of the user 204 with respect to a chatting application implemented at the information handling system 202—based on the words provided by the user 204 in the chat activity. The sentiment of the user 204 can be based on voice detection of the user 204 with respect to a voice-enabled application implemented at the information handling system 202—based on words provided by the user 204 when speaking. The user activity component can be based on performance of the user 204 with respect to the computer-implemented applications 250—e.g., with respect to a gaming application. For example, the performance of the user 204 when currently engaged with the gaming application can be compared to a baseline performance of the user 204 with respect to the gaming application. The user activity component can be based on biometrics of the user 204 when engaged with the computer-implemented applications 250—e.g., eye activity of the user 204. The user activity component can be based on an audio playlist of the user 204—e.g., a predetermined mood that is associated with the audio playlist.

The user activity component of the game rank component can further be based on a gaming persona/profile of the user 204. The gaming person of the user 204 can include such user data as type of game (social gamer, immersive game, casual gamer), as well as gameplay history of the user such as recency of engagement with the gaming applications, frequency of engagement of the gaming applications, and timing of engagement of the gaming applications.

The game rank component can include a social activity component. The social activity component can be based on social parameters such as the online status of socially-connected users to the user 204, the computer-implemented applications (e.g., gaming applications) the socially-connected users are engaging with, and a category of the socially-connected users (e.g., influencers). The social activity component can further be based on previous social interactions/engagements by the user 204 with the socially-connected users.

The game rank component can include an ecosystem events component. The ecosystems events component can be based on in-game events associated with the computer-implemented applications 250 (e.g., gaming applications). The ecosystem events component can include particular events for gaming applications such as timed events. For example, for a particular gaming application, the in-game events can include extra rewards or special play modes. The eco-system events component can include habit mechanics such as engagement with a particular gaming application only when a rewards system is active (i.e., gaming applications that offer incentives for engaging daily, weekly, monthly). The ecosystem events component can be further based on out-of-game events such as third party events (eSports events, championships, content updates).

The game rank component can include a dynamic factor component. The dynamic factor component can be based on historical session duration and expected session duration—a time the user 204 is expected to engage with a computer-implemented application 250 v. a match duration. For example, historically, the user 204 engages with the computer-implemented application 250 (e.g., a gaming application) 3-4 hours on Friday nights, and only 30 minutes on a weekday. A match duration of the gaming application typically lasts an hour. Thus, during weekdays, the user 204 typically would not engage with the gaming application, and the dynamic factor component can reflect such. The dynamic factor component can further be based on content consumption behaviors. For example, a particular computer-implemented application 250 can be associated with news articles, game streams, content reviews, videos, and the like. The content consumption behaviors can reflect the engagement by the user 204 with such content (e.g., likes, views, shares).

For example, the game rank component can indicate a first ranking of gaming applications that the user 204 is likely to engage with (e.g., based on gaming persona, gameplay history, friend activity, and content consumption). At a later time, the friend activity changes (e.g., a social contact of the user 204 is now engaged with a particular gaming application when previously was not engaged), and the game rank component can indicate a second ranking of gaming applications that the user 204 is likely to engage with, including increasing the raking of the particular gaming application.

For example, the game rank component can indicate a first ranking of gaming applications that the user 204 is likely to engage with (e.g., based on gaming persona, gameplay history, friend activity, and content consumption). The first ranking can include a ranking of gaming applications such as large, high-intense, and competitive multiplayer games. At a later time, the game rank component can indicate a second ranking of the gaming applications based on an updated mood/preference of the user 204 (e.g., based on biometric information, user performance, and similar). The second ranking can include a ranking of gaming application such as immersive single player titles.

Figure 6:
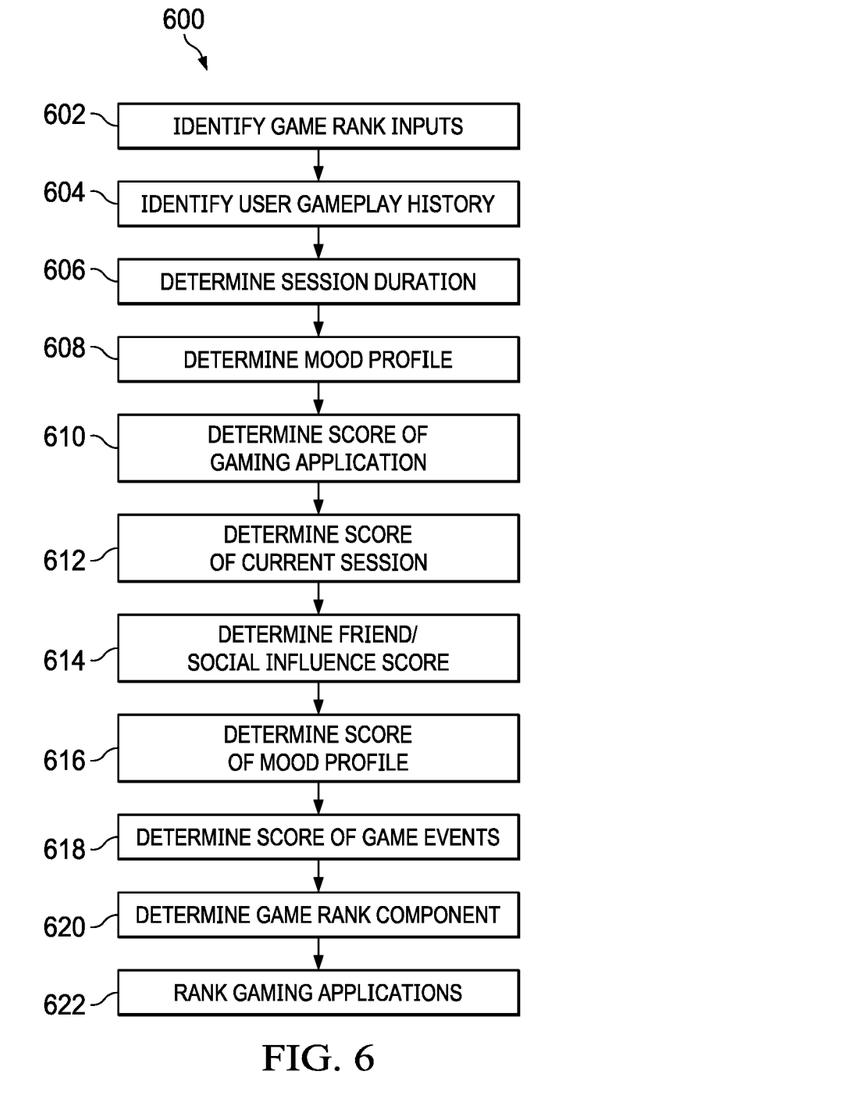

FIG. 6 illustrates a flowchart depicting selected elements of an embodiment of a method 600 for calculating the game rank component. The method 600 may be performed by the information handling system 100, the information handling system 202, the content aggregation computing module 210, the content scoring computing module 212, the interface creator computing module 214, and/or the engagement management computing module 280, and with reference to FIGS. 1-4. It is noted that certain operations described in method 600 may be optional or may be rearranged in different embodiments.

Game rank inputs are identified, at 602. For example, when the computer-implemented applications 250 include gaming applications, the content aggregation computing module 210 can identify a game inventory associated with the user 204; global per game match time estimates for gaming applications; friend/social presence associated with the user 204; sentiment of the user 204; biometrics of the user 204; gaming performance of the user 204; game events (in-game and out-of-game) associated with the gaming applications; and historical participation by the user 204 with the gaming applications.

User gameplay history is identified, at 604. For example, the content aggregation computing module 210 can identify the gameplay history of the user 204 based on the identified game inventory associated with the user 204.

Session duration is determined, at 606. For example, the content aggregation computing module 210 can determine (estimate) the session duration of the user 204 while engaging with a particular gaming application, based on the identified user gameplay history of the user 204.

A mood profile of the user 204 is determined, at 608. For example, the content aggregation computing module 210 can update the mood profile of the user 204 based on the identified sentiment of the user 204, biometrics of the user 204, and gaming performance of the user 204.

A score of the gaming application can be determined, at 610. For example, the content aggregation computing module 210 can determine a score of the gaming application based on the gameplay history of the user 204. The current session can be scored, at 612. For example, the content aggregation computing module 210 can score the current gaming session based on a compatibility of match time determined from the session duration. A score of friend/social influence can be determined, at 614. For example, the content aggregation computing module 210 can determine the friend/social influence score based on the identified friend/social presence associated with the user 204. A score of the mood profile of the user 204 can be determined with respect to the gaming applications, at 616. For example, the content aggregation computing module 210 can determine the mood profile score of the user 204 for the gaming applications based on the mood profile of the user 204. A score of the game events can be determined, at 618. For example, the content aggregation computing module 210 can determine the score of the game events based on the identified game events associated with the gaming applications, and historical participation by the user 204 with the gaming applications.

The game rank component can be determined, at 620. In particular, the content aggregation computing module 210 can calculate the game rank component based on one or more of the gaming application score, the current session score, the friend/social influence score, the mood profile score, and the game events score. The computer-implemented applications 250 (e.g., gaming applications) can be ranked based on the respective game rank component, at 622. For example, the content aggregation computing module 210 can rank the gaming applications.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of displaying multi-source content based on interaction data, the method comprising:
    identifying user interaction data associated with one or more computer-implemented applications, the user interaction data including interaction data of a particular user;
    identifying social interaction data associated with the one or more computer-implemented applications, the social interaction data including interaction data of one or more social contacts of the particular user;
    identifying regional interaction data associated with the one or more computer-implemented applications, the regional interaction data including interaction data of users of a particular region;
    filtering the user interaction data based on an effort weight component and a rarity weight component;
    filtering the social interaction data based on a friend rank weight component, a content similarity weight component, the effort weight component, an engagement weight component, and the rarity weight component;
    filtering the regional interaction data based on the engagement weight component and a game rank component;
    aggregating content associated with the computer-implemented applications based on the filtered user interaction data, the filtered social interaction data, and the filtered regional interaction data;
    scoring the aggregated content based on one or more weight components;
    applying, based on the content scores, interface adjustments to one or more interface elements of a graphical timeline, the graphical timeline depicting the one or more interface elements associated with the one or more computer-implemented applications; and
    rendering the graphical timeline for display on a display device.

2. The method of claim 1, further comprising:
    identifying user engagement with the graphical timeline by the particular user;
    updating the one or more weight components based on the user engagement; and
    updating the scoring of the aggregated content based on the one or more updated weight components associated with the particular user.

3. The method of claim 1, wherein the one or more weight components include the effort weight component, the rarity weight component, the friend rank weight component, the game rank weight component, the content similarity weight component, and the engagement weight component.

4. The method of claim 3, wherein scoring the aggregated content based on the one or more weight components includes scoring the aggregated content based on the engagement weight component, effort weight component, and the rarity weight component.

5. The method of claim 1, wherein the effort weight component is based on quantified interactions by the particular user with the one or more computer-implemented applications relative to quantified interactions by a population of other users.

6. The method of claim 1, wherein the rarity weight component is based on a distribution of a population of other users with a similar performance level of the computer-implemented application as the particular user.

7. The method of claim 1, wherein the friend rank component is based on an affinity to other users socially connected to the particular user.

8. The method of claim 1, wherein the game rank component is based on a likelihood of the particular user to engage with the one or more computer-implemented applications.

9. The method of claim 1, wherein the content similarity weight component is based on a similarity of content items of the one or more computer-implemented applications.

10. The method of claim 1, wherein the engagement weight component is based on a number of social interactions by the particular user and associated with the one or more computer-implemented application.

11. An information handling system comprising a processor having access to memory media storing instructions executable by the processor to perform operations comprising, comprising:
    identifying user interaction data associated with one or more computer-implemented applications, the user interaction data including interaction data of a particular user;
    identifying social interaction data associated with the one or more computer-implemented applications, the social interaction data including interaction data of one or more social contacts of the particular user;
    identifying regional interaction data associated with the one or more computer-implemented applications, the regional interaction data including interaction data of users of a particular region;
    filtering the user interaction data based on an effort weight component and a rarity weight component;
    filtering the social interaction data based on a friend rank weight component, a content similarity weight component, the effort weight component, an engagement weight component, and the rarity weight component;
    filtering the regional interaction data based on the engagement weight component and a game rank component;
    aggregating content associated with the computer-implemented applications based on the filtered user interaction data, the filtered social interaction data, and the filtered regional interaction data;

scoring the aggregated content based on one or more weight components;

applying, based on the content scores, interface adjustments to one or more interface elements of a graphical timeline, the graphical timeline depicting the one or more interface elements associated with the one or more computer-implemented applications; and rendering the graphical timeline for display on a display device.

12. The information handling system of claim 11, the operations further comprising:

identifying user engagement with the graphical timeline by the particular user;

updating the one or more weight components based on the user engagement; and updating the scoring of the aggregated content based on the one or more updated weight components associated with the particular user.

13. The information handling system of claim 11, wherein the one or more weight components include the effort weight component, the rarity weight component, the friend rank weight component, the game rank weight component, the content similarity weight component, and the engagement weight component.

14. The information handling system of claim 13, wherein scoring the aggregated content based on the one or more weight components includes scoring the aggregated content based on the engagement weight component, effort weight component, and the rarity weight component.

15. The information handling system of claim 11, wherein the effort weight component is based on quantified interactions by the particular user with the one or more computer-implemented applications relative to quantified interactions by a population of other users.

16. The information handling system of claim 11, wherein the rarity weight component is based on a distribution of a population of other users with a similar performance level of the computer-implemented application as the particular user.

17. The information handling system of claim 11, wherein the friend rank component is based on an affinity to other users socially connected to the particular user.

18. The information handling system of claim 11, wherein the game rank component is based on a likelihood of the particular user to engage with the one or more computer-implemented applications.

19. The information handling system of claim 11, wherein the content similarity weight component is based on a similarity of content items of the one or more computer-implemented applications.

20. A non-transitory computer-readable medium storing software comprising instructions executable by one or more computers which, upon such execution, cause the one or more computers to perform operations comprising:

identifying user interaction data associated with one or more computer-implemented applications, the user interaction data including interaction data of a particular user;

identifying social interaction data associated with the one or more computer-implemented applications, the social interaction data including interaction data of one or more social contacts of the particular user;

identifying regional interaction data associated with the one or more computer-implemented applications, the regional interaction data including interaction data of users of a particular region;

filtering the user interaction data based on an effort weight component and a rarity weight component;

filtering the social interaction data based on a friend rank weight component, a content similarity weight component, the effort weight component, an engagement weight component, and the rarity weight component;

filtering the regional interaction data based on the engagement weight component and a game rank component;

aggregating content associated with the computer-implemented applications based on the filtered user interaction data, the filtered social interaction data, and the filtered regional interaction data;

scoring the aggregated content based on one or more weight components;

applying, based on the content scores, interface adjustments to one or more interface elements of a graphical timeline, the graphical timeline depicting the one or more interface elements associated with the one or more computer-implemented application; and rendering the graphical timeline for display on a display device.

* * * * *